US012398497B2

(12) United States Patent
Huin et al.

(10) Patent No.: US 12,398,497 B2
(45) Date of Patent: Aug. 26, 2025

(54) COATING FORMULATION FOR CURTAIN COATING FIBROUS NON-WOVEN MATS

(71) Applicant: Owens Corning Intellectual Capital, LLC, Toledo, OH (US)

(72) Inventors: Vincent Huin, Chambery (FR); Shih-Chieh Kung, Columbus, OH (US); David Mountz, Westerville, OH (US); Merideth Cooper-Steiger, Westerville, OH (US); Brian Hatcher, Mount Holly, NC (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 311 days.

(21) Appl. No.: 17/907,769

(22) PCT Filed: Mar. 9, 2021

(86) PCT No.: PCT/US2021/021478
§ 371 (c)(1),
(2) Date: Aug. 29, 2022

(87) PCT Pub. No.: WO2021/183492
PCT Pub. Date: Sep. 16, 2021

(65) Prior Publication Data
US 2023/0109479 A1    Apr. 6, 2023

Related U.S. Application Data

(60) Provisional application No. 62/987,038, filed on Mar. 9, 2020.

(51) Int. Cl.
*D04H 1/587*    (2012.01)
*B32B 5/02*    (2006.01)
(Continued)

(52) U.S. Cl.
CPC .............. *D04H 1/587* (2013.01); *B32B 5/022* (2013.01); *B32B 5/245* (2013.01); *B32B 13/14* (2013.01);
(Continued)

(58) Field of Classification Search
CPC ... C09D 4/04; C09D 7/65; C09D 7/69; C09D 7/61; C09D 7/68; C09D 7/60;
(Continued)

(56) References Cited

U.S. PATENT DOCUMENTS 5,644,880 A    7/1997  Lehnert et al.
5,981,406 A    11/1999 Randall
(Continued)

FOREIGN PATENT DOCUMENTS

EP    1801278 A1    6/2007
EP    2230075 A1    9/2010
(Continued)

OTHER PUBLICATIONS

Zhou et al., Aggregation Behavior of Poly(Acrylic acid-co-Octadecyl Methacrylate and Bovine Serum Albumin in Aqueous Solutions, European Chemical Societies Publishing, vol. 10, Issue 3, Mar. 2021, pp. 373-379.*
(Continued)

*Primary Examiner* — Camie S Thompson
(74) *Attorney, Agent, or Firm* — Calfee, Halter & Griswold LLP (57) ABSTRACT

A coated non-woven fibrous mat is disclosed comprising a non-woven precursor mat including a plurality of randomly oriented fibers bound by a precursor binder composition, The non-woven fibrous precursor mat has a first major surface and a second major surface opposite to and having a surface roughness greater than the first surface, defining a thickness therebetween. A coating composition is applied to
(Continued)

the second major surface of the non-woven precursor mat and substantially uniformly penetrates 5% to less than 30% of the thickness of the non-woven precursor mat. The coating composition comprises a mineral filler and an organic latex binder composition. The coating composition is applied to the non-woven precursor mat in an amount between 1.0 and 10.0 lbs/100 ft$^2$.

15 Claims, 4 Drawing Sheets

(51) Int. Cl.
| | | |
|---|---|---|
| B32B 5/24 | (2006.01) | |
| B32B 13/14 | (2006.01) | |
| C09D 7/60 | (2018.01) | |
| C09D 7/65 | (2018.01) | |
| D04H 1/4218 | (2012.01) | |

(52) U.S. Cl.
CPC ............. *C09D 7/60* (2018.01); *C09D 7/65* (2018.01); *D04H 1/4218* (2013.01); *B32B 2255/02* (2013.01); *B32B 2262/101* (2013.01)

(58) Field of Classification Search
CPC ...... C09D 5/028; D04H 1/587; D04H 1/4209; D04H 1/4226; D04H 1/58; D04H 1/64; B32B 2264/303; B32B 5/022; B32B 5/20; B32B 5/245; B32B 13/14; B32B 2250/02; B32B 2250/03; B32B 2250/40; B32B 2255/02; B32B 2255/20; B32B 2255/26; B32B 2262/101; B32B 2266/0278; B32B 2307/54; B32B 2307/718; B32B 2307/724; B32B 2264/104; B32B 2607/00; C08K 3/22; C08K 3/346; C08K 3/36; C08K 2003/265
See application file for complete search history.

(56) References Cited

U.S. PATENT DOCUMENTS

| | | | |
|---|---|---|---|
| 6,723,670 | B2 | 4/2004 | Kajander et al. |
| 6,770,354 | B2 | 8/2004 | Randall et al. |
| 7,300,892 | B2 | 11/2007 | Porter |
| 7,338,702 | B2 | 3/2008 | Swales et al. |
| 7,547,375 | B2 | 6/2009 | Jaffee et al. |
| 7,553,780 | B2 | 6/2009 | Smith |
| 7,635,657 | B2 | 12/2009 | Bland et al. |
| 7,700,505 | B2 | 4/2010 | Leclercq et al. |
| 7,736,720 | B2 | 6/2010 | Yu et al. |
| 7,786,026 | B2 | 8/2010 | Newton et al. |
| 7,807,592 | B2 | 10/2010 | Bland et al. |
| 7,842,629 | B2 | 11/2010 | Jaffee |
| 7,867,927 | B2 | 1/2011 | Bush et al. |
| 7,932,193 | B2 | 4/2011 | Kajander |
| 7,976,904 | B2 | 7/2011 | Barcock et al. |
| 7,989,370 | B2 | 8/2011 | Currier et al. |
| 8,053,528 | B2 | 11/2011 | Shoemake |
| 8,461,067 | B2 | 6/2013 | Smith et al. |
| 8,603,927 | B2 | 12/2013 | Kajander |
| 9,243,401 | B2 | 1/2016 | Kragness et al. |
| 9,404,012 | B2 | 8/2016 | Connaughton, I et al. |
| 2002/0049272 | A1 | 4/2002 | Konopka et al. |
| 2003/0096058 | A1 | 5/2003 | Wirycz et al. |
| 2003/0199617 | A1* | 10/2003 | Larsson ............. C09D 101/284 524/49 |
| 2004/0092625 | A1 | 5/2004 | Pollock et al. |
| 2004/0266303 | A1 | 12/2004 | Jaffee |
| 2005/0020763 | A1 | 1/2005 | Milic |
| 2005/0130541 | A1 | 6/2005 | Shah |
| 2005/0202742 | A1* | 9/2005 | Smith ................ D06N 3/042 442/256 |
| 2006/0240236 | A1* | 10/2006 | Bland ................ E04C 2/043 428/292.1 |
| 2007/0141931 | A1 | 6/2007 | Nandi et al. |
| 2007/0148430 | A1 | 6/2007 | Agrawal |
| 2007/0197114 | A1 | 8/2007 | Grove |
| 2007/0212532 | A1 | 9/2007 | Krumbacher et al. |
| 2008/0003903 | A1 | 1/2008 | Nandi |
| 2008/0160301 | A1 | 7/2008 | Nandi et al. |
| 2008/0245012 | A1 | 10/2008 | Boisvert et al. |
| 2009/0029141 | A1 | 1/2009 | Shake et al. |
| 2009/0208714 | A1 | 8/2009 | Currier et al. |
| 2010/0080919 | A1 | 4/2010 | Krumbacher et al. |
| 2011/0054113 | A1 | 3/2011 | Kania et al. |
| 2011/0177352 | A1 | 7/2011 | Ambrose et al. |
| 2013/0178126 | A1 | 7/2013 | Bennett |
| 2015/0010730 | A1 | 1/2015 | Faynot et al. |
| 2015/0064433 | A1 | 3/2015 | Foster et al. |
| 2015/0314565 | A1 | 11/2015 | Hotchin et al. |
| 2016/0040427 | A1 | 2/2016 | Li et al. |
| 2016/0052168 | A1 | 2/2016 | Li |
| 2016/0145779 | A1 | 5/2016 | Teng et al. |
| 2016/0145785 | A1 | 5/2016 | Grove, III et al. |
| 2016/0208439 | A1 | 7/2016 | Lelogeay |
| 2016/0264461 | A1 | 9/2016 | Peng et al. |
| 2016/0347936 | A1 | 12/2016 | Garces et al. |
| 2017/0268143 | A1 | 9/2017 | Paradis et al. |
| 2017/0305783 | A1 | 10/2017 | Faynot et al. |
| 2017/0341337 | A1 | 11/2017 | Kirkwood et al. |
| 2018/0037514 | A1 | 2/2018 | Chowdhury et al. |
| 2018/0208725 | A1 | 7/2018 | Lakeman et al. |
| 2021/0332260 | A1* | 10/2021 | Wang ................ C09D 4/00 |

FOREIGN PATENT DOCUMENTS

| | | | | |
|---|---|---|---|---|
| EP | 1262591 | B1 | 10/2011 | |
| EP | 3121234 | A1 * | 1/2017 | ............... C08K 3/26 |
| EP | 3363773 | A1 | 8/2018 | |
| JP | 2000516844 | | * 12/2000 | |
| WO | 2006115921 | A1 | 4/2006 | |
| WO | 2007031419 | A1 | 3/2007 | |
| WO | 2007101822 | A1 | 9/2007 | |
| WO | 2016081903 | A1 | 5/2016 | |
| WO | 2017120611 | A1 | 7/2017 | |
| WO | 2019040601 | A1 | 2/2019 | |

OTHER PUBLICATIONS

Office Action from CN Application No. 202180020358.9 dated Nov. 28, 2023.
Gittens et al., "Variation of surface tension of water with temperature," Journal of Colloid and Interface Science, Academic Press, Inc., US, vol. 30, No. 3, Jul. 1, 1969, pp. 406-412.
Jianyi Du et al., "An improved Capillary Breakup Extensional Rheometer to characterize weakly rate-thickening fluids: Applications in synthetic automotive oils," Journal of Non-Newtonian Fluid Mechanics, vol. 291, May 1, 2021, p. 104496.
Office Action from EP Application No. 21714769.3 dated Jul. 10, 2023.
Office Action from CN Application No. 202180020358.9 dated Jun. 9, 2023.
Office Action from CN Application No. 202180020358.9 dated Feb. 28, 2024.
Dimic-Misic et al., "From colloidal spheres to nanofibrils: Extensional flow properties of mineral pigment and mixtures with micro and nanofibrils under progressive double layer suppression," Journal of Colloid and Interface Science, vol. 446, May 15, 2015, pp. 31-43.
International Search Report and Written Opinion from PCT/US2021/021478 dated Jun. 17, 2021.
Office Action from CA Application No. 3,174,485 dated Oct. 12, 2023.
Office Action from EP Application No. 21714769.3 dated Jan. 8, 2025.
Anonymous: "Room temperature—Wikipedia", en.wikipedia.org, Apr. 22, 2018 (Apr. 22, 2018), pp. 1-3, XP055479191, Retrieved (56) References Cited

OTHER PUBLICATIONS from the Internet: URL:https://en.wikipedia.org/wiki/ Room_temperature [retrieved on May 29, 2018].
Anonymous: "Room temperature - Definition and More", Merriam-Webster's Free Medical Dictionary, Apr. 10, 2010 (Apr. 10, 2010), pp. 1-1, XP093172404, Retrieved from the Internet: URL:https://web.archive.org/web/20100410144100/https://www.merriam-webster.com/ medical/room%20temperature.

* cited by examiner

COATING FORMULATION FOR CURTAIN COATING FIBROUS NON-WOVEN MATS

CROSS-REFERENCE TO RELATED APPLICATIONS

This application is the U.S. national stage entry of PCT/US2021/021478, filed on Mar. 9, 2021, which claims priority to and all benefit of U.S. Provisional Patent Application No. 62/987,038, filed on Mar. 9, 2020, the entire disclosures of which are fully incorporated herein by reference.

BACKGROUND

Fibrous mats such as fiberglass mats, have been employed as facers in the manufacture of fiberglass and polymer insulation and construction boards, such as gypsum and polyisocyanurate boards. Traditionally, facer materials have included, among others, non-woven fiber (e.g., fiberglass) mats, including non-woven fiberglass mats. Non-woven facers may be used to prepare boards with specific properties such as increased dimensional stability in the presence of moisture, increased biological resistance, increased air permeability, and greater physical and mechanical properties, such as better strength and durability, compared to conventional boards faced with paper or other cellulosic facing materials. Often, the fiber mats include a coating such as an aqueous-coating composition that is heat cured.

Non-woven fiber mats generally comprise randomly matted glass fibers bonded together by a cured thermoset or dried thermoplastic polymeric binder. The processes for forming such mats are generally well known, including for example, the well-known wet-laid processing and dry-laid processing methods. In one exemplary wet-laid process for forming non-woven fiberglass mats, chopped glass fibers are provided to a conveying apparatus such as a conveyor by a storage container for conveyance to a mixing tank that may contain the white water (e.g., various surfactants, viscosity modifiers, defoaming agents, and/or other chemical agents) with agitation to disperse the fibers and form a chopped glass fiber slurry. The glass fiber slurry may be transferred to a head box where the slurry is deposited onto a conveying apparatus such as a moving screen or foraminous conveyor, and a substantial portion of the water from the slurry is removed to form a web (mat) of enmeshed fibers. The water may be removed from the web by a conventional vacuum or air suction system.

A binder is then applied to the web by a suitable binder applicator, such as the spray applicator or a curtain coater. Once the binder has been applied to the mat, the binder coated mat is passed through at least one drying oven to remove any remaining water and cure the binder composition. The formed non-woven fiber mat that emerges from the oven is an assembly of randomly oriented, dispersed, individual glass fibers.

The non-woven fiber mats may then be coated or impregnated with a coating composition and cured, forming a facing material, to impart various properties to the facing and downstream construction board panel. The coating compositions are generally applied by, for example, blade, bar, air-knife or reverse-roll type coating methods, usually at high speeds. However, traditional coating methods require contact with the fiber mats, increasing the risk that the fibers are damaged or broken during the coating process. Additionally, the applicators used in these methods are non-contoured (with the exception of air-knife coating method), such that when used on rough substrates, any irregular substrate surface may cause non-uniform coating thickness, coating "skips," where the coating misses a section of the mat due to a bump or irregularity in the mat, partially coated fiber bumps, and other irregularities in the coated mat.

Conventional paper-type facing materials were often coated by a curtain coating method, which is a pre-metered coating process based on free flow on a paper surface from a coating head located above the surface to be coated. The surface of the paper is coated by forming a freely-falling vertical curtain of liquid so that it impinges onto the paper surface. A controlled relationship is maintained between the flow rate of the liquid and the speed at which the paper is moved, so that the curtain is stable and has a uniform flow rate across its width to obtain a layer of the coating onto the facer. The coating head is defined using properties of the coating fluid, so as to obtain a uniform coating film thickness in the running direction or the transverse direction of the machine.

An advantage of curtain coating is the ability to create a uniform coating on the surface of substrates. Another advantage is the lack of contact between the coating head and the support, unlike contact coating processes such as blade and rod coating. Thus, the application of force on the surface of substrates can be eliminated, which further eliminates web and fiber breakage, while allowing an increase in machine line speed.

The above-described curtain coating method has thus far not been successfully implemented to coat a fibrous, non-paper substrate, such as fibrous non-woven mats. Fibrous non-woven mats formed of course fibers, such as glass fibers, include fibers randomly extending along the X-axis, the Y-axis, and the Z-axis. Fibers extending in the Z-axis direction extend perpendicular to the plane of the non-woven mat, creating bumps and surface roughness that traditional coating compositions cannot form a smooth surface using the curtain coating method. Accordingly, non-paper fibrous non-woven facers are typically coated using a knife coating method or like method that applies pressure to the fibers as the coating is applied, causing fibers to lay flatter as they are coated. Such coating methods also push the coating composition into the facer, such that the coating tends to penetrate the thickness of the facer to a depth of at least 30%.

Accordingly, it is desirable to develop a coating composition that is capable of application to a non-paper fibrous facer via curtain coating, while producing a lightweight coated facer with a generally smooth surface.

SUMMARY

Various exemplary aspects of the present inventive concepts are directed to a coating composition for application to a non-woven fibrous mat. The coating composition comprises at least 70 wt. % solids of mineral filler; about 5 wt. % to about 25 wt. % solids of an organic latex binder composition; and about 0.01 wt. % to about 5.0 wt. % solids of a rheology modifier. The coating composition has a surface tension of at least 30 dyne/cm, an extensional property of filament break-up time about 0.01 to 1.0 seconds and a shear viscosity of about 200 to 6000 centipoise.

In some exemplary embodiments, the coating composition includes a mineral filler slurry that comprises a mineral filler selected from the group consisting of calcium carbonate, talc, aluminum hydroxide (ATH), quicklime, zinc oxide, mixed oxides, iron oxides, chromates, glass beads, silicates, clay, and sand. The mineral filler may comprise a plurality of particles having a median particle size of less than 5 microns, such as between about 0.5 and 3.5 microns.

In some exemplary embodiments, the latex binder composition comprises a hydrophobic latex binder, which may comprise an acrylic latex. The coating composition further includes a rheology modifier present in the composition in an amount from 0.1 to about 1.0 wt. % solids. The rheology modifier may comprise any of polyacrylamide, anionic polyacrylate, anionic polyacrylamide copolymer, nonionic polyether, nonionic hydrophobically modified polyethylene oxide urethane copolymer, hydrophobically modified cellulose ethers, or mixtures thereof.

Further exemplary aspects of the present inventive concepts are directed to a coated non-woven fibrous mat. The coated non-woven mat comprises a non-woven precursor mat including a plurality of randomly oriented fibers bound by a precursor binder composition, the non-woven fibrous precursor mat having a first major surface and a second major surface opposite to and having a surface roughness greater than the first surface, defining a thickness therebetween. The coated non-woven mat further includes a coating composition applied to the second major surface of the non-woven precursor mat and substantially uniformly penetrating 5% to less than 30% of the thickness of the non-woven precursor mat. The coating composition comprises a mineral filler and an organic latex binder composition. In some exemplary embodiments, the coating composition is applied to the non-woven precursor mat in an amount between 1.0 and 10.0 lbs/100 ft$^2$. The coated non-woven fibrous mat may have a Gurley porosity of less than 60 seconds, in accordance with TAPPI T 460. In some exemplary embodiments, the coated non-woven fibrous mat may have a Gurley porosity of at least 500 seconds, in accordance with TAPPI T 460.

Further exemplary aspects of the present inventive concepts are directed to coated non-woven fibrous mat that comprises a non-woven precursor mat including a plurality of randomly oriented fibers bound by a precursor binder composition, the non-woven fibrous precursor mat having a first major surface and a second major surface opposite to and having a surface roughness greater than the first surface, defining a thickness therebetween. A coating composition is applied to the first major surface of the non-woven precursor mat and substantially uniformly penetrating 5% to less than 30% of the thickness of the non-woven precursor mat. The coating composition comprises a mineral filler and an organic latex binder composition. The coated non-woven fibrous mat has a Gurley porosity of at least 500 seconds, in accordance with TAPPI T 460. In some exemplary embodiments, the coated non-woven fibrous mat may have a Gurley porosity of less than 60 seconds, in accordance with TAPPI T 460.

Further exemplary aspects of the present inventive concepts are directed to a coated non-woven fibrous mat, comprising a non-woven precursor mat including a plurality of fibers bound by a precursor binder composition. The non-woven fibrous precursor mat has a first major surface and a second major surface opposite to the first surface, defining a thickness therebetween. The non-woven precursor mat has a surface energy of between about 45-70 dynes/cm. The coated non-woven mat further includes a coating composition applied to a surface of the non-woven precursor mat and substantially uniformly penetrating 5% to less than 30% of the thickness of the non-woven precursor mat. The coating composition comprises a mineral filler slurry and an organic latex binder composition. The coating composition has a surface tension that is within 5 to 20 dynes/cm of the surface energy of the non-woven precursor mat.

In some exemplary embodiments, the fibers of the non-woven precursor mat comprise a first blend of glass fibers having an average fiber diameter of 12 microns to 14 microns and a second blend of glass fibers having an average fiber diameter of 9 microns to 11 microns.

In some exemplary embodiments, the non-woven precursor has an uncoated basis weight of 25 g/m$^2$ to 300 g/m$^2$.

The coating composition may penetrate less than 30% of the thickness of the non-woven mat, such as a penetration of 10% to 20% of the thickness of the non-woven precursor mat.

In some exemplary embodiments, the coating composition comprises at least 70 wt. % mineral filler, based on the total solids weight of the coating composition.

Further exemplary aspects of the present inventive concepts are directed to a process of forming the coated non-woven fibrous mat, wherein the process comprises applying a free-falling vertical curtain of the coating composition to a non-woven precursor mat.

Yet further exemplary aspects of the present inventive concepts are directed to a construction board comprising a core layer having a first face and a second face; a coated non-woven mat having a first major surface and a second major surface, opposite to and having a surface roughness greater than the first surface, defining a thickness therebetween, the first surface of the non-woven precursor mat being adhered to the first face of the core layer. The coated non-woven mat comprises a non-woven precursor mat including a plurality of randomly oriented fibers bound by a precursor binder composition, and a coating composition applied to the second major surface of the non-woven precursor mat and substantially uniformly penetrating 5% to less than 30% of the thickness of the non-woven precursor mat. The coating composition comprises a mineral filler and an organic latex binder composition. In some exemplary embodiments, the coating composition is applied to the non-woven precursor mat in an amount between 1.0 and 10.0 lbs/100 ft$^2$.

Yet further exemplary aspects of the present inventive concepts are directed to a construction board comprising a core layer having a first face and a second face; a coated non-woven mat having a first major surface and a second major surface, opposite to and having a surface roughness greater than the first surface, defining a thickness therebetween, the first surface of the non-woven precursor mat being adhered to the first face of the core layer. The coated non-woven mat comprises a non-woven precursor mat including a plurality of randomly oriented fibers bound by a precursor binder composition, and a coating composition applied to the first major surface of the non-woven precursor mat and substantially uniformly penetrating 5% to less than 30% of the thickness of the non-woven precursor mat, said coating composition comprises a mineral filler and an organic latex binder composition. The coating composition is applied to the non-woven precursor mat in an amount between 1.0 and 10.0 lbs/100 ft$^2$.

BRIEF DESCRIPTION OF THE FIGURES

The subject matter of the present disclosure is particularly pointed out and distinctly claimed in the concluding portion of the specification. A more complete understanding of the disclosure, however, may best be obtained by referring to the detailed description and claims when considered in connection with the figures, wherein like numerals denote like elements.

DETAILED DESCRIPTION

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

The terms "binder" and "binder composition," are used interchangeably herein to mean a material that holds one or more components of a non-woven article together. Those of ordinary skill in the art will understand that a binder composition is often an aqueous mixture or solution of dissolved ingredients that is cured to bond reinforcing fibers together.

Unless otherwise indicated, all numbers expressing quantities of ingredients, properties, temperatures, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

All combinations of method or process steps as used herein can be performed in any order, unless otherwise specified or clearly implied to the contrary by the context in which the referenced combination is made. Additionally, all combinations of compositions and compositional ranges may be used in any combination of compositions listed herein.

The general inventive concepts are based, at least in part, on the discovery of an improved coating composition for application via the curtain coating process to a non-paper fibrous mat and a lightweight, pre-coated non-woven mat formed therefrom.

The lightweight, pre-coated non-woven mat comprises a precursor mat of intermingled, randomly oriented fibers that have been bonded together by a binder composition. As used herein, the term "fiber" encompasses fibers, filaments, wool, yarns, tows, and the like. In one or more embodiments, the non-woven fiber mat may include discrete fibers, such as chopped fibers, or continuous fibers, or mixture of discrete fibers and continuous fibers.

Exemplary fibers for forming the non-woven mat of the present disclosure include, but are not limited to, glass fibers, synthetic fibers (e.g., polyester fibers, polyethylene fibers, polypropylene fibers, polyethylene terephthalate fibers, polyamide fibers, aramid fibers, polyaramid fibers), mineral fibers, cellulose fibers, carbon fibers, ceramic fibers, or a blend of two or more different types of reinforcing fibers.

The glass fibers can be made from any type of glass. Examples of glass fibers include A-type glass fibers, C-type glass fibers, E-type glass fibers, S-type glass fibers, ECR-type glass fibers (e.g., Advantex® glass fibers commercially available from Owens Corning), Hiper-tex™ glass fibers, wool glass fibers, and combinations thereof. Natural fibers are plant fibers extracted from any part of a plant, including, but not limited to, the stem, seeds, leaves, roots, or phloem. Examples of natural fibers which may be suitable for use as the reinforcing fiber material include basalt, cotton, jute, bamboo, ramie, bagasse, hemp, coir, linen, kenaf, sisal, flax, henequen, and combinations thereof. Synthetic fibers are man-made fiber having suitable reinforcing characteristics, such as polyester, polyethylene, polyethylene terephthalate, polypropylene, polyamide, aramid, and polyaramid fibers, as well as combinations thereof.

The fibers of the non-woven precursor mat comprise glass fibers having an average diameter between 6 and 20 microns. In certain embodiments, the glass fibers used to form the non-woven precursor mat have an average fiber diameter of 10 microns to 18 microns. In certain other embodiments, the glass fibers used to form the non-woven precursor mat have an average fiber diameter of 13 microns to 16 microns, or 12.5 to 14 microns.

It is also contemplated that a blend of glass fibers having different fiber diameters, such as a blend of smaller diameter glass fibers (e.g., average fiber diameter of 6.5 microns to 10 microns) and larger diameter glass fibers (e.g., average fiber diameter of 13 microns to 16 microns) may be used to form the non-woven precursor mat. In certain embodiments, the plurality of reinforcing fibers of the non-woven mat comprise a blend of 50% to 70% by weight first glass fibers and 30% to 50% by weight second glass fibers, wherein the first glass fibers have an average fiber diameter between about 12 to 14 microns and the second glass fibers have an average fiber diameter of about 9 to 11 microns. In certain embodiments, the plurality of reinforcing fibers of the non-woven mat comprise a blend of 55% to 65% by weight first glass fibers and 35% to 45% by weight second glass fibers, wherein the first glass fibers have an average fiber diameter between 12 and 14 microns and the second glass fibers have an average fiber diameter between 9 and 11 microns. In certain embodiments, the plurality of reinforcing fibers of the non-woven precursor mat comprise a blend of 60% by weight first glass fibers and 40% by weight second glass fibers.

The glass fibers used to form the non-woven precursor mat may also have a variety of fiber lengths. In certain embodiments, the glass fibers used to form the non-woven mat have an average fiber length of 0.25 inches (6.35 mm) to 2 inches (50.8 mm). In certain embodiments, the glass fibers used to form the non-woven precursor mat have an average fiber length of 0.5 inches (12.7 mm) to 1.5 inches (38.1 mm). In certain other embodiments, the glass fibers used to form the non-woven mat have an average fiber length of 0.70 inches (17.78 mm) to 1 inch (25.4 mm). It is also contemplated that a blend of glass fibers having different fiber lengths, such as a blend of shorter glass fibers (e.g., average fiber length of 0.25 inches (6.35 mm) to 0.5 inches (12.7 mm)) and longer glass fibers (e.g., average fiber length of 0.72 inches (18.29 mm) to 1.25 inches (31.75 mm)) may be used to form the non-woven precursor mat.

In certain exemplary embodiments, the plurality of fibers of the non-woven precursor mat comprise a blend of 60% by weight first glass fibers and 40% by weight second glass fibers, wherein the first glass fibers have an average fiber diameter of 13 microns and an average fiber length of 0.75 inches (19.05 mm), and the second glass fibers have an average fiber diameter of 10 microns and an average fiber length of 0.39 inches (10 mm). In certain other exemplary embodiments, the plurality of fibers comprise 100% glass fibers having an average diameter of about 13.5 microns and an average length of about 0.75 inches.

The non-woven precursor mats may generally comprise randomly oriented glass fibers bonded together by a cured polymeric binder. The processes for forming such mats are generally well known, including, for example, the well-known wet-laid processing and dry-laid processing methods. One exemplary wet-laid process for forming the precursor mat includes dispersing chopped glass fibers in white water (e.g., various surfactants, viscosity modifiers, defoaming agents, and/or other chemical agents) in a mixing tank with agitation to disperse the fibers and form a chopped glass fiber slurry. The glass fiber slurry may be transferred to a head box where the slurry is deposited onto a conveying apparatus such as a moving screen or foraminous conveyor, and a substantial portion of the water from the slurry is removed to form a web (mat) of enmeshed fibers. The water may be removed from the web by a conventional vacuum or air suction system.

A precursor binder is then applied to the web by a suitable binder applicator, such as a spray applicator or a curtain coater. Once the precursor binder has been applied to the mat, the binder coated mat is passed through at least one drying oven to remove any remaining water and cure the binder composition. The formed precursor mat that emerges from the oven is an assembly of randomly oriented, dispersed, individual glass fibers.

Suitable precursor binder compositions useful in the production of precursor mats include formaldehyde-free (or no-added formaldehyde ("NAF")) binders, such as carboxyl-based binder compositions, polyvinyl alcohol-based binder compositions, carbohydrate-based binder compositions, and the like. Such binders are free of added formaldehyde and are environmentally friendly, i.e., "green." However, in some exemplary embodiments, the precursor binder composition may include formaldehyde systems, such as urea formaldehyde systems.

The precursor binder may comprise a thermoset binder with at least one polycarboxy polymer as the thermoset binder resin. The polycarboxy polymer comprises an organic polymer or oligomer containing more than one pendant carboxy group. The polycarboxy polymer may be a homopolymer or copolymer prepared from one or more unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, $\alpha,\beta$-methyleneglutaric acid, and the like. Alternatively, the polycarboxy polymer may be prepared from unsaturated anhydrides including, but not limited to, maleic anhydride, itaconic anhydride, acrylic anhydride, methacrylic anhydride, and the like, as well as mixtures thereof. The polymerization of these acids and anhydrides is considered to be within the abilities of one of ordinary skill in the art.

In some exemplary embodiments, the precursor binder composition comprises a thermoset acrylic package that includes a blend of thermoset hydrophilic and hydrophobic acrylic binder materials. The thermoset acrylic package may include includes but is not limited to, acrylic emulsions, acrylic solutions, or mixtures thereof. The thermoset nature of the acrylic package reduces the stickiness of the binder and thus reduces the binder sticking to processing equipment during the manufacturing process. In some embodiments, the thermoset acrylic package includes a mixture of an acrylic homopolymer and a styrene-acrylic latex. The acrylic homopolymer may be present in an amount from about 50 wt. % to about 80 wt. %, or from about 60 wt. % to about 75 wt. %, based on the total weight of precursor binder solids. The styrene-acrylic latex may be present in an amount from about 20 wt. % to about 45 wt. %, or from about 25 wt. % to about 40 wt. %, based on the total weight of binder solids.

The precursor binder composition may further optionally include an antifoam. In some exemplary embodiments, the antifoam includes one or more of siloxanes, mineral oil, and polyoxyalkylene, although any antifoam may alternatively be used. An exemplary antifoam includes a polyether siloxane. In some exemplary embodiments, the antifoam is present in the binder composition in an amount from about 0.001 wt. % to about 1.0 wt. %, including between about 0.01 wt. % to about 0.25 wt. %, based on the total weight of the solids in the precursor binder composition.

In certain embodiments, the precursor binder composition may optionally contain at least one coupling agent. In certain embodiments, the coupling agent is a silane coupling agent. The coupling agent may be present in the binder composition in an amount from 0.01% to 5% by weight (on a dry weight basis), from 0.01% to 2.5% by weight (on a dry weight basis), from 0.1% to 0.5% by weight (on a dry weight basis), or from 0.15% to 0.25% by weight (on a dry weight basis) of the binder composition.

Non-limiting examples of silane coupling agents that may be used in the precursor binder composition may be characterized by the functional groups including, but not limited to, alkyl, aryl, amino, epoxy, vinyl, methacryloxy, ureido, isocyanato, and mercapto. In certain embodiments, the silane coupling agent includes silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., γ-aminopropyltriethoxysilane and γ-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes.

The precursor binder composition may also include one or more additional additives, such as an extender, a catalyst, a processing aid, anti-dusting agent, viscosity modifier, pH adjusting agent, crosslinking density enhancer, a deodorant, an antioxidant, a moisture resistant agent, or combinations thereof. Optionally, the binder may comprise, without limitation, dyes, pigments, additional fillers, colorants, UV stabilizers, thermal stabilizers, emulsifiers, preservatives (e.g., sodium benzoate), corrosion inhibitors, and mixtures thereof. Other additives may be added to the precursor binder composition for the improvement of process and product performance. Such additives include lubricants, wetting agents, antistatic agents, and/or water-repellent agents. Additives may be present in the precursor binder composition from trace amounts (such as about 0.1% or less by weight the binder composition) up to about 10% by weight of the total solids in the binder composition.

The precursor binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers.

In some exemplary embodiments, the binder composition is included in the fiber mat in an amount from 10.0 to 30.0 g/m$^2$, including between 15.0 and 27 g/m$^2$, and between 16.0 and 25 g/m$^2$.

The non-woven precursor fiber mats of the present disclosure may have a wide range of basis weights (uncoated). In certain embodiments, the non-woven fiber mats have an uncoated basis weight of 25 g/m$^2$ to 300 g/m$^2$. In certain other embodiments, the non-woven fiber mats have an uncoated basis weight of 30 g/m$^2$ to 270 g/m$^2$. In still other embodiments, the non-woven fiber mats have an uncoated basis weight of 40 g/m$^2$ to 200 g/m$^2$, including an uncoated basis weight of 50 g/m$^2$ to 150 g/m$^2$, an uncoated basis weight of 55 g/m$^2$ to 125 g/m$^2$, and also including an uncoated basis weight of 65 g/m2 to 110 g/m$^2$.

The non-woven precursor fiber mats of the present disclosure may also have a variety of thicknesses. In certain embodiments, the non-woven fiber mats have a thickness of 0.25 mm to 2 mm. In certain other embodiments, the non-woven fiber mats have a thickness of 0.3 mm to 1.5 mm. In still other embodiments, the non-woven fiber mats have a thickness of 0.5 mm to 1.0 mm. In certain embodiments, the non-woven fiber mats have a thickness of 0.65 mm to 0.9 mm.

Following the application of the precursor binder composition, the binder coated web of fibers is passed through an oven to cure (or partially cure) the binder composition, forming a precursor mat. The precursor mat may be stored for later use or transferred (either in-line or to a separate manufacturing line) to a coating station, wherein the precursor mat is coated on a single side with a coating composition. In some exemplary embodiments, the coating station comprises a curtain coater, which comprises a coating head that distributes a pre-metered vertical curtain of coating liquid onto the surface of the precursor mat. The precursor mat has a length extending in the machine direction of the curtain coater, a width extending in a cross direction of the curtain coater, and a thickness extending between two major surfaces of the precursor mat. Typically, fibrous mats are formed having one major surface that is more rough than the other surface. The rough surface is generally known as the "air" side and the smoother surface is generally known as the "wire" side, since the glass on this surface is pushed and pulled into the smooth binder application wire. As the air side surface has nothing to constrain it, it is naturally rougher in texture. In conventional precursor coating systems, the precursor mat is coated on the smoother surface of the mat, in an effort to produce a coated facer having a smooth appearance. However, the ability to coat a non-woven fibrous mat on the rougher side is advantageous when coating a precursor mat in-line, since it prevents manufacturing waste and additional equipment needed to flip a mat to its smoother side.

It has surprisingly been discovered that the subject coating composition can be applied via the curtain coating process to the rough, or air surface, of the precursor mat while achieving a pre-coated facer with a smooth appearance. Additionally, by coating on the rough surface, the coating composition penetrates less of the precursor thickness, allowing more space for a core material to penetrate through the opposite surface of the precursor, increasing the bond strength between the facer and the core.

The curtain coating method distributes a uniform or substantially uniform layer of coating composition upon a first major surface of the precursor mat. In some exemplary embodiments, the coating composition extends into the thickness of the precursor mat to a substantially uniform degree along the entire length and width of the mat. In some exemplary embodiments, the coating composition penetrates at least 5%, but no more than 30% of the thickness of the precursor mat. In some exemplary embodiments, the coating composition penetrates at least 8%, but less than 30% of the thickness of the precursor mat, including a penetration of 10% to 25%, 13% to 23%, and 15 to 20% of the thickness of the precursor mat. In some exemplary embodiments, the coating composition penetrates 10 to 20% of the thickness of the precursor mat. In other exemplary embodiments, the coating penetrates 20 to less than 30% of the thickness of the precursor mat.

The depth of penetration may be determined by a number of factors, such as the surface energy of the precursor mat, surface tension of the coating composition, hydrophobicity of the precursor mat, and mat porosity.

To this regard, it is important to align the surface energy of the uncoated precursor mat with the surface tension of the coating composition, in order to achieve a coating penetration that is less than 30% of the thickness of the mat. Thus, the precursor binder composition is selected to impart a surface energy to the uncoated precursor mat in the range of 30 to 70 dynes/cm, as determined by Kruss K100 Force Tensiometer, which measures dynamic contact angle in water and diiodomethane to calculate surface free energy. In some exemplary embodiments, the uncoated precursor mat has a surface energy in the range of 45 to 60 dynes/cm, or in the range of 48 to 58 dynes/cm, or in the range of 50 to 55 dynes/cm. It has been discovered that the desired coating penetration of less than 30% of the precursor mat thickness can be achieved when the surface tension of the coating composition is within 20 dynes/cm of the surface energy of the non-woven precursor mat. In various exemplary embodiments, the surface tension of the coating composition is within 15 dynes/cm of the surface energy of the non-woven precursor mat, including within 10 dynes/cm of the surface energy of the non-woven precursor mat, and within 5 dynes/cm of the surface energy of the non-woven precursor mat. In some exemplary embodiments, the surface tension of the coating composition is within 5 to 20 dynes/cm of the surface energy of the non-woven precursor mat.

In some exemplary embodiments, it has been discovered that the coating penetration may be particularly limited to less than 30% of the precursor thickness when the surface energy of the precursor mat is at least about equal to, but preferably higher than, the surface energy of the non-woven precursor mat. In some exemplary embodiments, the surface tension of the coating composition is at least 45 dynes/cm, including at least 50 dynes/cm, and at least 53 dynes/cm.

The coating composition is applied in an amount between 1.0 to 10.0 lbs./100 ft$^2$, including between 1.2 and 8.0 lbs./100 ft$^2$, between 1.5 and 6.0 lbs./100 ft$^2$, and between 1.8 and 5.0 lbs./100 ft$^2$. Once coated, the coated non-woven facer has a total basis weight between 2.8 and 7.0 lbs./100 ft$^2$, including between 3.0 and 5.5 lbs./100 ft$^2$, between 3.1 and 4.9 lbs./100 ft$^2$, and between 3.3 lbs./100 ft$^2$ and 4.4 lbs./100 ft$^2$.

The coating composition may comprise a polymeric binder component and a filler component, which may also be referred to as a mineral pigment. Suitable polymeric binders may include a polymer or copolymer of acrylic acid, methacrylic acid, acrylates, methacrylates, acrylonitrile, styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-actate (EVA), and poly-vinyl-acetate (PVA), and combinations thereof. In one or more embodiments, the polymeric binder is a hydrophobic latex binder. The hydrophobic latex binder may comprise a polymer or copolymer of acrylic acid, such as, for example vinyl versatate acrylic.

The polymeric binder is present in the coating composition in an amount from 2% to 20%, based on the total solids of the coating composition (the non-water portion of the coating composition), including between 4% to 15%, 5% to 10% polymeric binder, and 5.5% to 7.5%, based on the weight of the total solids in the coating composition.

It has been surprisingly discovered that a coating composition with a higher filler content (greater than 70 wt. % solids), compared to traditional coating compositions, particular those for use in curtain coating applications (i.e., for paper substrates). Paper substrates are less open/porous than glass substrates. Thus, the coating compositions for paper substrates require less solids. In one or more embodiments, the coating composition may include 75% to 98% filler, in other embodiments, 85% to 96% filler, and in other embodiments 90% to 93% filler, based on the weight of the total solids in the coating composition. Exemplary fillers suitable for making coated facers include, but are not limited to, ground limestone (calcium carbonate), clay (kaolin), sand, mica, talc, gypsum (calcium sulfate dihydrate), aluminum trihydrate (ATH), vermiculite, antimony oxide, micronized rubber, or a combination of any two or more of these substances.

The filler may be in the form of a dry powder or may be incorporated as a pre-mixed filler slurry. To aid in dispersion of the filler in water, dispersants may be included, such as, for example, sodium polyacrylate, ammonium polyacrylate, sodium salt of an acrylic copolymer, potassium salt of an acrylic copolymer, ammonium salt of an acrylic copolymer, polyalkoxylated copolymer, nonionic copolymers, and mixtures thereof. In some exemplary embodiments, the dispersant is present in the coating composition in an amount from about 0.01 wt. % to about 2.0 wt. %, including between about 0.05 wt. % to about 1.5 wt. %, between about 0.1 wt. % and 1.0 wt. %, and between about 0.14 and 0.5 wt. %, based on the total weight of the solids in the coating composition. In some exemplary embodiments, the slurry further includes one or more surfactants.

In some exemplary embodiments, the filler comprises a plurality of particles having a median particle size of less than 5.0 microns, such as between about 0.5 and 3.5 microns, between about 0.8 and 2.8 microns, and between about 1.0 and 2.5 microns. In some exemplary embodiments, the filler comprises calcium carbonate with a median particle size of about 1.5 microns. By utilizing a smaller particle size than traditional coating compositions, less coating composition needs to be applied to a precursor mat, while still providing the targeted porosity (about 10 to about 60 seconds in gypsum applications and above 500 seconds in polyisocyanurate applications).

The coating composition may further include rheology modifier. The rheology modifier enhances the curtain coating process by incorporating the extensional properties of the coating composition, forming a more stable coating composition that is capable of maintaining a cohesive coating layer over the rough surface caused by course fibers. A coating composition with desired extensional properties helps to enhance the runnability, coat z-direction fibers, and overcome mat defects. A coating with desired extensional properties also provides a more consistent product quality with desired product performance, such as consistent Gurley value.

In some exemplary embodiments, the rheology modifier imparts extensional properties to the coating composition. Extensional properties of coatings are measured by Capillary Breakup Extensional Rheometer (HAKKE CaBER 1, ThermoFisher). The break-up time of a coating fluid filament is used to evaluate the extensional properties of the coatings.

In some exemplary embodiments, the break-up time of a coating fluid filament of the subject coating composition ranges from 0.01 to 12.0 seconds, such as between 0.05 and 0.8 seconds, between 0.1 and 0.6 seconds, and 0.3 to 0.5 seconds.

The rheology modifier synergistically works with the high filler content of the coating composition to create a film, such that a lower amount of coating can be applied to the precursor mat. The rheology modifier further helps to improve the appearance of the coated facer (e.g., less defects, smoothness) and performance (e.g., consistent Gurley value). In some exemplary embodiments, the rheology modifier is a high molecular weight polymeric composition having a molecular weight of at least 2 million, or at least 5 million, or at least 10 million. The rheology modifier may be emulsified in oil, such that the rheology modifier exists in dual phases. Exemplary rheology modifiers include polyacrylamide, anionic polyacrylate, anionic polyacrylamide copolymer, nonionic polyether, nonionic hydrophobically modified polyethylene oxide urethane copolymer, hydrophobically modified cellulose ethers.

In some exemplary embodiments, the rheology modifier comprises a high molecular weight polyacrylamide copolymer, having a molecular weight of at least 1,000,000.

It has been surprisingly discovered that some conventional rheology modifiers do not sufficiently increase the extensional viscosity of the coating composition to the level required for curtain coating fibrous non-woven mats. Such rheology modifiers include some of the alkali swellable emulsion (HASE/ASE type) and hydrophobically modified ethoxylated urethane (HEUR). Thus, in some exemplary embodiments, the coating composition is free of such conventional rheology modifiers.

In some exemplary embodiments, the rheology modifier is present in the coating composition in an amount from about 0.01 wt. % to about 5.0 wt. %, including between about 0.05 wt. % to about 2.0 wt. %, between about 0.1 wt. % and 1.5 wt. %, and between about 0.15 and 0.5 wt. %, based on the total weight of the solids in the coating composition.

In some exemplary embodiments, the coating composition may further include a biocide. The fouling of non-woven mats and facers primarily occurs through accumulated charged particles, biological growth, and fungal growth. Biological or fungal attacks are more typically a problem in pools, showers, and other hot, humid environments, but can also occur in any surface covering or dry wall application. Examples of suitable biocides for use in the inventive composition include diiodomethyl-p-tolylsulfone, glutarealdehyde, isothiazolin, zinc oxide, zinc omadine, and silver. An exemplary biocide includes Amical™ Flowable (available commercially from DuPont). In some exemplary embodiments, the biocide is present in the coating composition in an amount from 0.01 wt. % to 1.0 wt. %, including between 0.05 wt. % to 0.25 wt. %, based on the total weight of the solids in the coating composition.

In one or more embodiments, the coating composition may be an aqueous coating composition. In one or more embodiments, the coating composition may include 2% to 20% water, including 4% to 15% water, or 5% to 10% water based on the total weight coating composition.

The coating composition has a shear viscosity that is higher than coating compositions for use in coating non-woven fibrous mats (about 1,000 centipoise) and lower than the viscosity of coating compositions conventionally used in curtain coating paper facers. In some exemplary embodiments, the coating composition has a shear viscosity of between about 200 centipoise and about 6000 centipoise, including between about 400 centipoise and about 4000 centipoise, and between about 600 centipoise and about 3000 centipoise.

The coating composition may have a density between 1.0 and 2.0 g/cc, including between 1.2 and 1.8 g/cc, and between 1.5 and 1.7 g/cc.

The coated non-woven facer demonstrates an increased tensile strength, while having an unconventionally low coat weight. The tensile strength is measured in accordance with the TAPPI T 1009 test method. In some exemplary embodiments, the coated non-woven facer demonstrates a machine direction tensile strength of at least 100 lbs/3-inch width, including at least about 125 lbs/3-inch width, at least 145 lbs/3-inch width, and at least 150 lbs/3-inch width. In some exemplary embodiments, the coated non-woven facer demonstrates a cross machine direction tensile strength of at least 70 lbs/3-inch width, including at least about 100 lbs/3-inch width, at least 105 lbs/3-inch width, and at least 115 lbs/3-inch width.

The coated non-woven facer demonstrates a water absorption (Cobb) value (according to TAPPI Method T441) of less than 1.0 grams, including less than 0.8 grams, less than 0.5 grams, less than 0.3 grams. In some exemplary embodiments, the coated non-woven facer demonstrates a Cobb value of about 0.05 to about 0.25 grams.

As mentioned above, the coated non-woven facers of the present inventive concepts may be formulated to achieve a desired porosity level, based on the intended application of the facer. For instance, in some exemplary embodiments, the coated non-woven facers are formulated for application to a gypsum core, requiring a high porosity to allow for the passage of water vapor as the gypsum core is heated and set. Thus, in some exemplary embodiments, the coated non-woven facers demonstrate a Gurley porosity of less than 60 seconds, as tested according to TAPPI Method T 460. In these or other embodiments, the coated non-woven facers may demonstrate a Gurley porosity of about 5 seconds to about 55 seconds, including between about 10 seconds to about 50 seconds. In other exemplary embodiments, the coated non-woven facers are formulated for application to a polyisocyanurate core, requiring a lower porosity, such as a Gurley porosity of at least 500 seconds. In these or other embodiments, the coated non-woven facers may demonstrate a Gurley porosity of about 250 seconds to about 1000 seconds, including about 500 seconds to about 950 seconds. The Gurley porosity may be adjusted up or down by adjusting the coating weight and/or coating solids.

The general inventive concepts also contemplate the pre-coated non-woven mats discussed herein as a part of a construction board comprising a substrate, such as gypsum or foam (polyisocyanurate or "polyiso"). In some exemplary embodiments, the construction boards comprise a non-woven facer adhered to the first or second major surface of the core, or to both the first and second surfaces. The non-woven facers adhered to the first and/or second major surfaces of the core may be the same or different. Although, such construction boards are herein described in the form of "sandwich" panels or boards wherein the core is covered with a facer on both sides, it may also include a board having a facer of this type only on one side. The other side may have another type of facer or none at all, depending on the manner in which it is to be used.

In some exemplary embodiments, the construction board comprises a gypsum board. Generally, gypsum boards contain a core formed of a gypsum material that are reinforced by at least one facing layer (often two layers, with one on each major surface of the board). Known methods for making gypsum boards consists of providing a continuous feed of facing material and depositing a gypsum slurry onto a surface of the facing material. A second continuous feed of facing material is then applied to the top surface of the slurry. The slurry is dried to harden the gypsum composition and to integrate the facing material into the board. The gypsum board is subsequently cut to a predetermined length for shipping and eventual use.

Gypsum boards formed of a gypsum core sandwiched between facing layers are commonly used in the construction industry as internal walls and ceilings for both residential and commercial buildings. Formulations and the design of the gypsum board may be tailored for the specific use desired for the board. In one or more embodiments, the gypsum core includes gypsum, optionally wet chopped glass fibers, water resistant chemicals, binders, accelerants, and low-density fillers.

In one or more embodiments, the pre-coated facer may be included in the manufacture of a foam board. The foam board includes a foam core with two opposing sides and at least one pre-coated facer situated on one of the opposing sides. Suitable foams for use in the foam board include polyurethane and polyisocyanurate foams. Polyisocyanurate and polyurethane foam compositions have three major components: a polyfunctional isocyanate compound, a polyol and a blowing agent. When these three components are mixed, along with small amounts of catalysts and surfactants, a heat-generating chemical reaction causes the liquid blowing agent to boil. The resultant blowing agent vapor expands the foam to create gas-filled cells.

In one or more embodiments, the foam board may be described by the density of the foam material. With regard to higher density coverboard, such boards comprise a foam core having an average density of at least 3.0 lbs./ft$^3$. In these or other embodiments, the foam core has an average density of 3.0 lbs./ft$^3$ to 25 lbs./ft$^3$, in other embodiments 4.0 lbs./ft$^3$ to 8 lbs./ft$^3$, and in other embodiments at least 4.2 lbs./ft$^3$.

In one or more embodiments, the foam board may comprise a high-density foam board, such as coverboard, having an average density greater than 3 lbs/ft$^3$. In these or other embodiments, the foam board has a density or an average density of 3 lbs/ft$^3$ to 25 lbs/ft$^3$, and in other embodiments 6 lbs/ft$^3$ to 23 lbs/ft$^3$. In other embodiments, the foam board may comprise a lower density foam board, such as an insulation board, with an average density less than 3 lbs/ft$^3$. In some exemplary embodiments, the foam core has an average density of 1 lbs./ft$^3$ to 2.8 lbs./ft$^3$, and in other embodiments 1.5 lbs./ft$^3$ to 2.0 lbs./ft$^3$. In some exemplary embodiments, the lower density insulation board comprises a foam core with a density below 2.0 lbs./ft$^3$. In other embodiments, the foam board has a density or an average density of 1 lb/ft$^3$ to 6 lbs/ft3, and in other embodiments about 2 lbs/ft$^3$ to 5 lbs/ft$^3$.

EXAMPLES

Example 1

Figure 1:
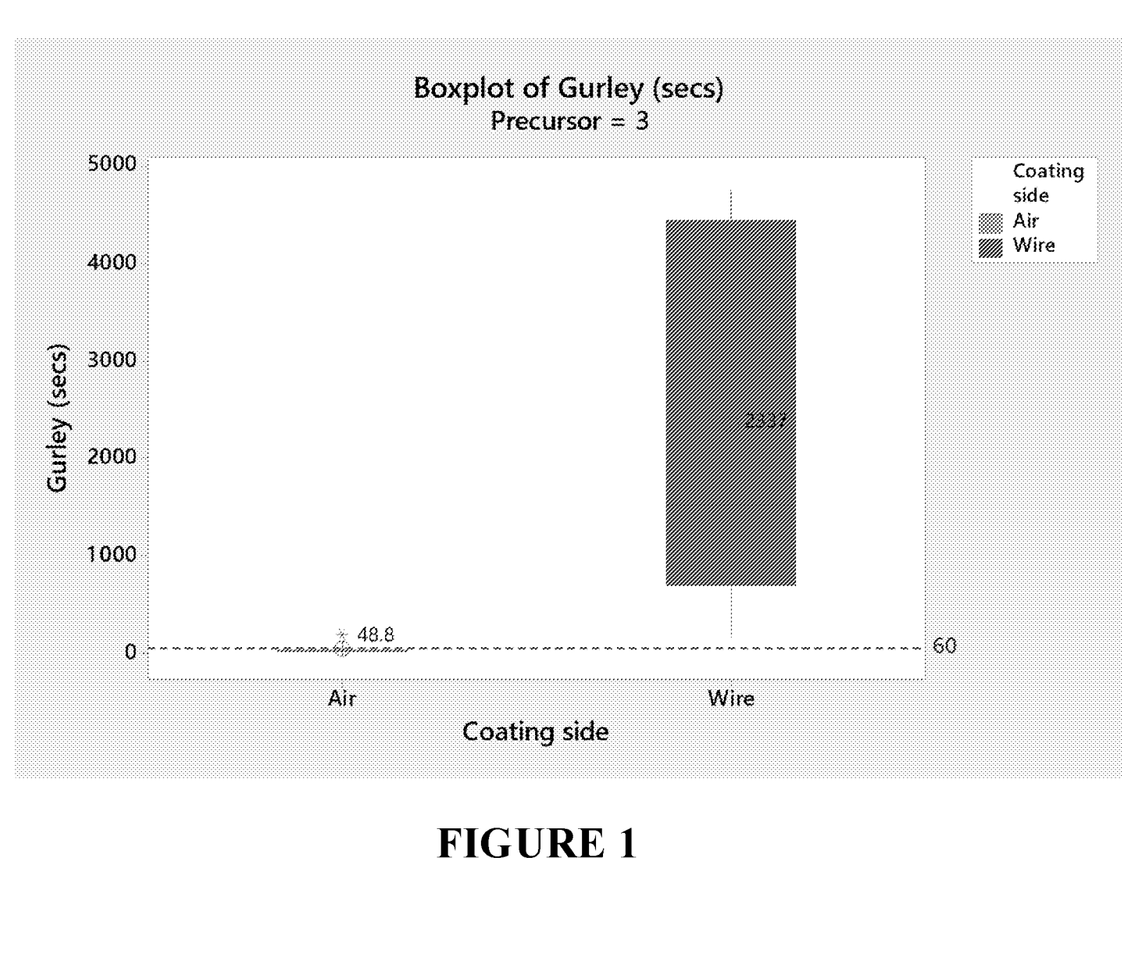
FIG. 1 graphically illustrates the Gurley porosity values for exemplary facers coated on the air (rough) surface in comparison to the wire (smooth) surface.

A precursor mat was prepared comprising a mixture of 13.5 micron diameter/19-mm length glass fibers and 10-micron diameter/10 mm length glass fibers in a ratio of 7:3. The precursors were each curtain coated with a coating composition comprising 92.8 wt. % solids of 1.5 micron diameter calcium carbonate particles, 7.0 wt. % solids of an acrylic binder, and 0.2 wt. % of a rheology modifier. One precursor mat was coated on its air (rough) surface and one precursor mat was coated on its wire (smooth) surface. As illustrated in FIG. 1, coating on the wire-side of the precursor mat demonstrated higher Gurley porosity (an average Gurley porosity of 2,337 seconds) compared to coating on the air side of the precursor mat (an average Gurley porosity of 48.8 seconds).

Example 2

Precursor mats were prepared comprising 13.0 micron diameter/19 mm length glass fibers and a precursor binder comprising a binder resin that is a blend of 50% of a polyacrylic amine polymer and 50% of an acrylic latex. The precursor basis weight was 2.1 lbs/100 ft$^2$ and has an LOI of 21%.

The precursors were each curtain coated with a coating composition outlined below in Table 1.

TABLE 1

|  | Example A dry percentage (%) | Example B dry percentage (%) | Example C dry percentage (%) |
| --- | --- | --- | --- |
| Coating Composition | | | |
| Calcium Carbonate (median diameter 1.4 microns) | 92.18 | 92.16 | 92.08 |
| Copolymer of acrylic acid A | 6.99 | 6.99 | 6.99 |
| Colorant | 0.45 | 0.45 | 0.45 |
| Biocide | 0.18 | 0.18 | 0.18 |
| Rheology modifier-polyacrylamide copolymer | 0.2 | 0.2 | 0.2 |
| Wetting agent | — | 0.025 | 0.10 |
| Coating Properties | | | |
| Viscosity (cps, #3@60 rpm) | 591 | 593 | 568 |
| Surface tension (dynes/cm) | 59 | 50 | 44 |
| Coated Veil Properties | | | |
| Precursor Surface Energy (dynes/cm) | 50 | 50 | 50 |
| Add-on weight (lbs./100 ft2) | 3.5 | 3.5 | 3.5 |
| Gurley (seconds) | 163 | 51 | 0 |

As illustrated in Table 1, the addition of the wetting agent decreased the surface tension of the coating composition, which in turn decreased the Gurley porosity, when applied to a precursor mat with a surface energy of 50 dynes/cm. Coatings A and B, with surface tensions at least equal to or higher than the surface energy of the precursor (50 dynes/cm), resulted in a desirable coated mat porosity for application to a gypsum board, with a Gurley of about 51-163 seconds. The surface tension of Coating C was lower than the surface energy of precursor, resulting in a very porous pre-coated facer, with Gurley porosity of zero.

Example 3

Precursor mats were prepared comprising 13.0 micron diameter/19 mm length glass fibers and a precursor binder comprising a binder resin that is a blend of 50% of a polyacrylic amine polymer and 50% of an acrylic latex. The precursor basis weight was 2.1 lbs/100 ft$^2$ and has an LOI of 21%.

The precursors were each curtain coated with a coating composition outlined below in Table 2.

TABLE 2

| | Example D dry percentage (%) | Example E dry percentage (%) | Example F dry percentage (%) | Example G dry percentage (%) |
|---|---|---|---|---|
| Coating Composition | | | | |
| Calcium Carbonate (median diameter 1.4 microns) | 92.18 | 90.67 | — | — |
| Calcium Carbonate (median diameter 3.2 microns) | — | — | 92.17 | 92.17 |
| Copolymer of acrylic acid A | — | 8.5 | — | — |
| Copolymer of acrylic acid B | 6.99 | — | — | — |
| Copolymer of acrylic acid C | — | — | 7.0 | 7.0 |
| Colorant | 0.45 | 0.45 | 0.45 | 0.45 |
| Biocide | 0.18 | 0.18 | 0.18 | 0.18 |
| Rheology modifier-polyacrylamide copolymer | 0.2 | 0.2 | 0.2 | 0.2 |
| Coating Properties | | | | |
| Viscosity (cps, #3@60 rpm) | 755 | 1252 | 1120 | 475 |
| Surface tension (dynes/cm) | 60 | 66 | 54 | 49 |
| Coated Veil Properties | | | | |
| Precursor BW (lbs./100 ft2) | 2.1 | 2.1 | 2.1 | 2.1 |
| Precursor LOI (%) | 21 | 21 | 21 | 21 |
| Add-on weight (lbs./100 ft2) | 2.7 | 3.1 | 3.1 | 3.1 |
| Gurley (seconds) | 29 | 955 | 460 | 75 |

As illustrated in Table 2, the Gurley porosity values can be tuned between 29 seconds and 955 seconds by varying filler content and mean filler sizes (1.4 micron and 3.2 micron).

Further tunability aspects include varying the binder content, coating add-on weight, and/or coating viscosity.

Example 4

Precursor mats were prepared comprising 13.0 micron diameter/19 mm length glass fibers and a precursor binder comprising a binder resin blend of 50% polyacrylic amine polymer and 50% acrylic latex. The precursor basis weight was 2.1 lbs/100 ft$^2$ and has an LOI of 21%.

The precursors were each curtain coated with a coating composition outlined below in Table 3.

TABLE 3

| | Example H-(3.1 lbs) dry percentage (%) | Example H-(3.9 lbs) dry percentage (%) | Example 1-3.1 lbs dry percentage (%) |
|---|---|---|---|
| Coating Composition | | | |
| Calcium Carbonate (median diameter 1.4 microns) | 92.18 | 92.18 | 92.10 |
| Copolymer of acrylic acid A | 6.99 | 6.99 | 6.99 |
| Colorant | 0.45 | 0.45 | 0.45 |
| Biocide | 0.18 | 0.18 | 0.18 |
| Rheology modifier-polyacrylamide copolymer | 0.2 | 0.2 | 0.28 |
| Coating Properties | | | |
| Viscosity (cps, #3@60 rpm) | 616 | 616 | 967 |
| Surface tension (dynes/cm) | 55 | 55 | 58 |
| CaBER break-up time(seconds) | 0.6 | 0.6 | 0.93 |
| Coated Veil Properties | | | |
| Precursor BW (lbs./100 ft2) | 2.1 | 2.1 | 2.1 |
| Precursor LOI (%) | 21 | 21 | 21 |

TABLE 3-continued

|  | Example H-(3.1 lbs) dry percentage (%) | Example H-(3.9 lbs) dry percentage (%) | Example 1-3.1 lbs dry percentage (%) |
|---|---|---|---|
| Add-on weight (lbs./100 ft2) | 3.1 | 3.9 | 3.1 |
| Gurley (seconds) | 13 | 85 | 132 |
| Surface Roughness (Ra, microns) | 20.3 | 18.6 | 14.0 |

Figure 2:
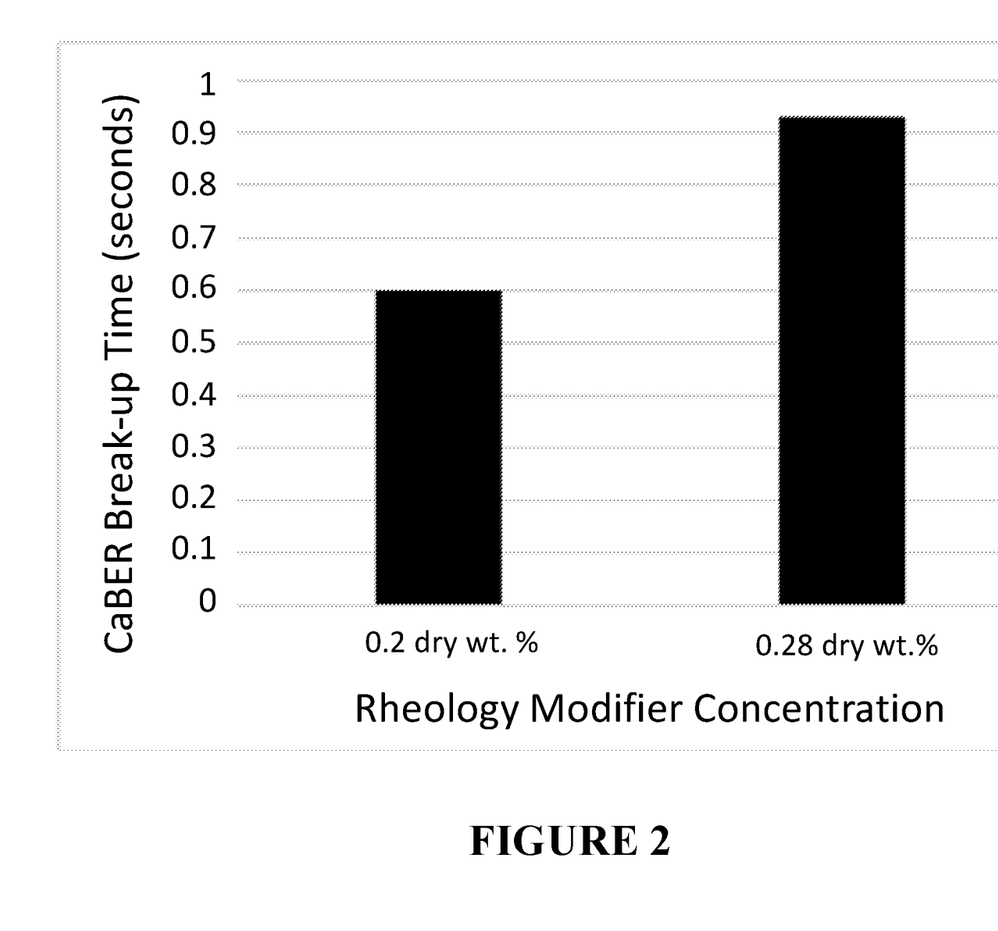
FIG. 2 graphically illustrates the CaBER break-up time for coating compositions having varied concentrations of rheology modifier.
Figure 3:
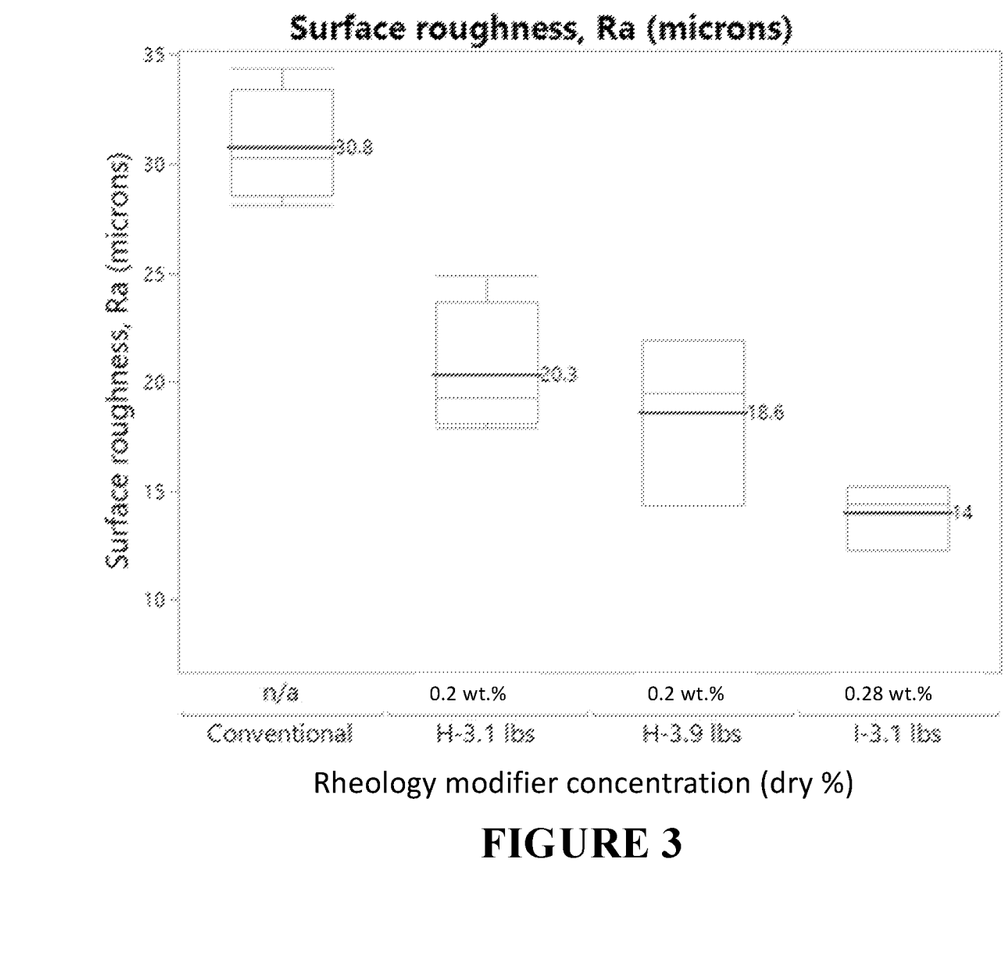
FIG. 3 graphically illustrates the surface roughness of various coated non-woven mats having varied concentrations of rheology modifier compared to a control.

The CaBER break-up time, Gurley porosity, and surface roughness of each curtain coated mat outlined in Table 3, above. The surface roughness was measured using a Sarrett SR400 Surface Roughness Tester with a test length of 2.5 mm. As illustrated in Table 3 and FIG. 2, the CaBER break-up time increased from 0.6 to 0.93 seconds by increasing the rheology modifier concentration from 0.2 to 0.28 wt. % (based on the total dry weight of the composition). Additionally, the Gurley porosity was increased by increasing both the coat weight and the rheology modifier concentration. Increasing the coat weight and rheology modifier concentration also reduced surface roughness, as illustrated in FIG. 3.

Example 5

Precursor mats were prepared comprising 13.0 micron diameter/19 mm length glass fibers and a precursor binder comprising a binder resin that is a blend of 50% of a polyacrylic amine polymer and 50 of an acrylic latex. The precursor basis weight was 2.1 lbs/100 ft$^2$ and has an LOI of 210%.

The precursors were each curtain coated with a coating composition outlined below in Table 4, below.

TABLE 4

|  | Example J dry percentage (%) |
|---|---|
| Coating Composition | |
| Calcium Carbonate (median diameter 1.4 microns) | 90.8 |
| Copolymer of acrylic acid A | 7.0 |
| Colorant | 2.0 |
| Rheology modifier-polyacrylamide copolymer | 0.2 |
| Coating Properties | |
| Viscosity (cps, #3@60 rpm) | 1044 |
| Surface tension (dynes/cm) | 59 |
| CaBER break-up time(seconds) | 0.28 |
| Coated Veil Properties | |
| Precursor BW (lbs./100 ft2) | 2.1 |
| Precursor LOI (%) | 21 |
| Add-on weight (lbs./100 f2) | 3.6 |
| Tensile Strength-MD (lbs/3" width) | 205 |
| Tensile Strength-CD (lbs/3" width) | 132 |

Table 4 illustrates that the tensile strength of a curtain-coated acrylic precursor with a coating composition applied in an amount of 3.6 lbs./100 ft$^2$ showed high tensile strength in both the machine (205 lbs/3" width) and cross-directions (132 lbs/3" width).

Figure 4:
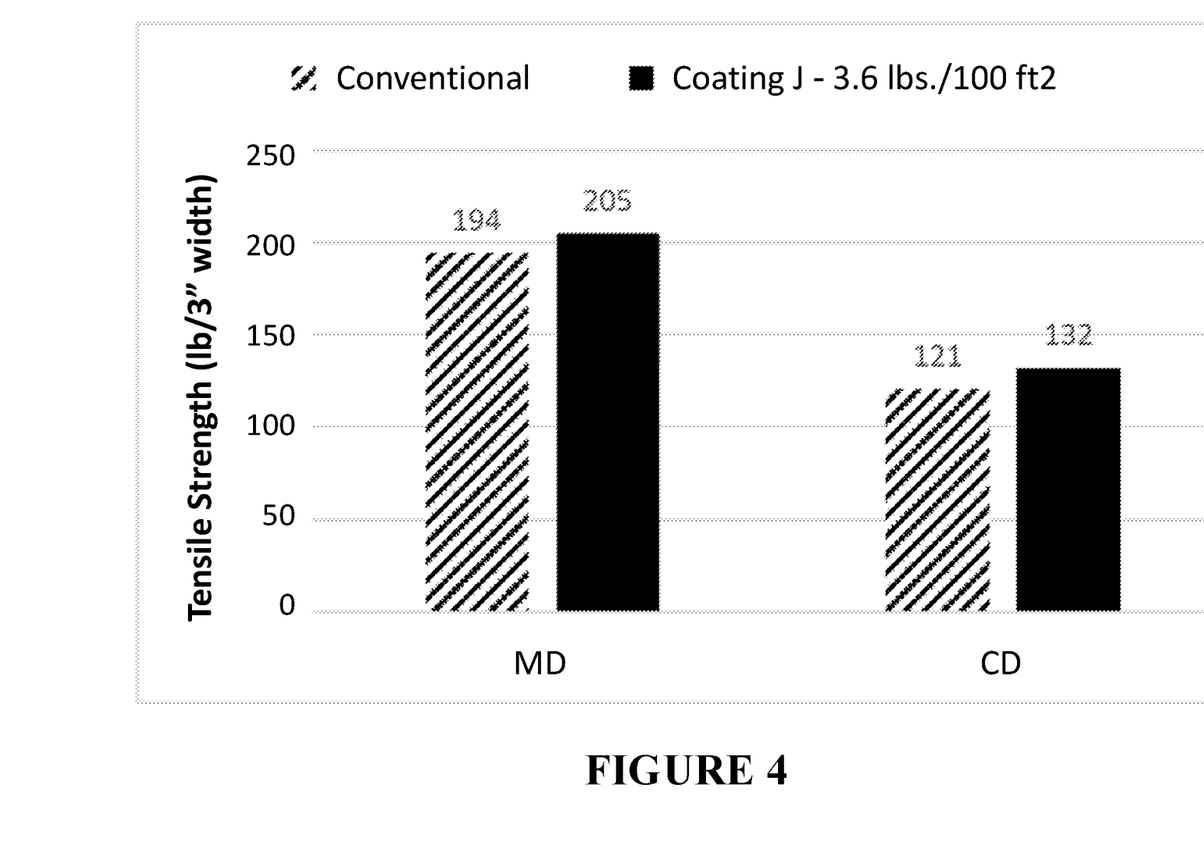
FIG. 4 graphically illustrates the tensile strength (lbs/3-in width) for a non-woven mat coated with coating composition according to the present exemplary embodiments compared to a control.

As illustrated in FIG. 4, the coated mat of Example J (at 3.6 lbs/100 ft$^2$ coat weight) showed a higher tensile strength in both MD and CD, compared to a conventional coated facer with higher coating add-on (estimated 4.1-6.1 lbs./100 ft$^2$). The estimated coating penetration of the conventional facer is 30-50% of the facer thickness, while the estimated coating penetration of Example J is 20-30%.

It will be appreciated that the scope of the general inventive concepts and associated proprietary information is not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts and any equivalents thereof.

The invention claimed is:

1. A coated non-woven fibrous mat, comprising:
 a non-woven precursor mat including a plurality of randomly oriented fibers bound by a precursor binder composition, said non-woven fibrous precursor mat having a first major surface and a second major surface opposite to and having a surface roughness greater than the first surface, defining a thickness therebetween; and
 a coating composition applied to the second major surface of the non-woven precursor mat and substantially uniformly penetrating 5% to less than 30% of the thickness of the non-woven precursor mat, said coating composition comprising about 90 wt. % to about 93 wt. % solids of a mineral filler having a median particle size of less than 5 microns, an organic latex binder composition, and about 0.01 wt. % to about 5.0 wt. % solids of a rheology modifier, wherein the rheology modifier comprises polyacrylamide, anionic polyacrylate, anionic polyacrylamide copolymer, nonionic polyether, nonionic hydrophobically modified polyethylene oxide urethane copolymer, hydrophobically modified cellulose ethers, or mixtures thereof;
 wherein the coating composition is applied to the non-woven precursor mat in an amount between 1.0 and 10.0 lbs/100 ft$^2$, and wherein said coated non-woven fibrous mat has a Gurley porosity of less than 60 seconds or at least 500 seconds, in accordance with TAPPI T 460.

2. The coated non-woven fibrous mat of claim 1, wherein the fibers of the non-woven precursor mat comprise a first blend of glass fibers having an average fiber diameter of 12 microns to 14 microns and a second blend of glass fibers having an average fiber diameter of 9 microns to 11 microns.

3. The coated non-woven fibrous mat of claim 1, wherein the precursor binder composition is formaldehyde-free.

4. The coated non-woven fibrous mat of claim 1, wherein the precursor binder composition comprises a blend of thermoset hydrophilic acrylic and thermoset hydrophobic acrylic binder materials.

5. The coated non-woven fibrous mat of claim 1, wherein non-woven precursor has an uncoated basis weight of 25 g/m² to 300 g/m².

6. The coated non-woven fibrous mat of claim 1, wherein the coating composition penetrates 10% to 20% of the thickness of the non-woven precursor mat.

7. The coated non-woven fibrous mat of claim 1, wherein the coating composition is applied to the non-woven precursor mat in an amount between 1.5 and 5.0 lbs/100 ft².

8. The coated non-woven fibrous mat of claim 1, wherein the mat has a cross-direction tensile strength according to TAPPI T 1009 of at least 125 lbs/3-inch width.

9. A process of forming the coated non-woven fibrous mat of claim 1, wherein the process comprises applying a free-falling vertical curtain of the coating composition to the non-woven precursor mat.

10. The coated non-woven fibrous mat of claim 1, wherein the coating composition, when applied, has a surface tension of at least 30 dyne/cm and is applied to the non-woven precursor mat in an amount between 1.0 and 10.0 lbs/100 ft².

11. The coated non-woven fibrous mat of claim 1, wherein said precursor mat having a surface energy of between about 45-70 dynes/cm; and
wherein the coating composition has a surface tension that is within 5 to 20 dynes/cm of the surface energy of the non-woven precursor mat.

12. The coated non-woven fibrous mat according to claim 1, wherein the mineral filler comprises a plurality of particles having an average particle size of less than 3 microns.

13. A construction board comprising:
a core layer having a first face and a second face; and
a coated non-woven mat having a first major surface and a second major surface, opposite to and having a surface roughness greater than the first surface, defining a thickness therebetween, the first surface of the non-woven precursor mat being adhered to the first face of the core layer, wherein the coated non-woven mat comprises:
a non-woven precursor mat including a plurality of randomly oriented fibers bound by a precursor binder composition, and
a coating composition applied to the first major surface or the second major surface of the non-woven precursor mat and substantially uniformly penetrating 5% to less than 30% of the thickness of the non-woven precursor mat, said coating composition comprises about 90 wt. % to about 93 wt. % solids of a mineral filler having a median particle size of less than 5 microns, an organic latex binder composition, and about 0.01 wt. % to about 5.0 wt. % solids of a rheology modifier, wherein the rheology modifier comprises polyacrylamide, anionic polyacrylate, anionic polyacrylamide copolymer, nonionic polyether, nonionic hydrophobically modified polyethylene oxide urethane copolymer, hydrophobically modified cellulose ethers, or mixtures thereof;
wherein the coating composition is applied to the non-woven precursor mat in an amount between 1.0 and 10.0 lbs/100 ft².

14. The construction board of claim 13, wherein the coating composition penetrates 10% to 20% of the thickness of the non-woven precursor mat.

15. The construction board of claim 13, wherein the mat has a tensile strength according to TAPPI T 1009 of at least 125 lbs/3-inch width.

* * * * *